United States Patent
Pedarla (10) Patent No.: US 11,925,133 B1
(45) Date of Patent: Mar. 12, 2024

(54) CORN LEAF DISEASE DETECTION

(71) Applicant: Kuval Pedarla, Austin, TX (US)

(72) Inventor: Kuval Pedarla, Austin, TX (US)

(*) Notice: Subject to any disclaimer, the term of this patent is extended or adjusted under 35 U.S.C. 154(b) by 43 days.

(21) Appl. No.: 18/327,881

(22) Filed: Jun. 1, 2023

(51) Int. Cl.
| | | |
|---|---|---|
| A01B 79/00 | (2006.01) | |
| G06T 7/00 | (2017.01) | |
| G06V 10/82 | (2022.01) | |
| G06V 20/10 | (2022.01) | |
| G06V 20/17 | (2022.01) | |

(52) U.S. Cl.
CPC .......... *A01B 79/005* (2013.01); *G06T 7/0012* (2013.01); *G06V 10/82* (2022.01); *G06V 20/17* (2022.01); *G06V 20/188* (2022.01); G06T 2207/20081 (2013.01); G06T 2207/20084 (2013.01); G06T 2207/20132 (2013.01); G06T 2207/30188 (2013.01)

(58) Field of Classification Search
CPC .... G06V 10/82; G06V 10/764; G06V 20/188; G06V 20/68; G06V 10/454; G06V 10/774; G06V 10/776; G06V 20/60; G06V 10/44; G06V 10/50; G06V 10/762; G06V 10/771; G06V 20/10; G06V 20/20; G06V 20/52; G06V 20/693; G06V 20/70; G06V 20/17; A01B 79/005; G06T 7/0012; G06T 2207/20081; G06T 2207/20084; G06T 2207/20132; G06T 2207/30188
See application file for complete search history.

(56) References Cited

U.S. PATENT DOCUMENTS

| | | | |
|---|---|---|---|
| 10,986,789 B1* | 4/2021 | Roberts | A01G 9/26 |
| 2018/0120274 A1* | 5/2018 | Roseway | G01N 31/224 |
| 2019/0114481 A1* | 4/2019 | DeChant | G06V 10/764 |
| 2020/0134392 A1* | 4/2020 | Gui | G06N 3/08 |
| 2023/0017425 A1* | 1/2023 | Bereciartua-Perez | G06T 7/0002 |

OTHER PUBLICATIONS

Picon et al. ( Deep convolutional neural networks for mobile capture device-based crop disease classification in the wild, 2019) (Year: 2019).*

* cited by examiner

*Primary Examiner* — Mohammad K Islam
(74) *Attorney, Agent, or Firm* — Kunzler Bean & Adamson (57) ABSTRACT

Apparatuses, systems, methods, and computer program products for corn leaf disease detection are described. An apparatus may include an image sensor, an electronic display screen, a processor, and/or a memory storing computer program code executable by the processor to perform operations. An operation may include receiving an image of a corn leaf taken by an image sensor. An operation may include processing an image of a corn leaf using multiple machine learning models, each of the multiple machine learning models determining one or more likelihoods that the corn leaf has a plurality of diseases. An operation may include determining whether a corn leaf has any of a plurality of diseases based on one or more likelihoods. An operation may include displaying, in response to determining that a corn leaf has one or more of a plurality of diseases, the one or more of the plurality of diseases to a user on an electronic display screen.

16 Claims, 4 Drawing Sheets

CORN LEAF DISEASE DETECTION

FIELD

This invention relates to image-based disease detection and more particularly relates to artificial intelligence image-based corn leaf disease detection.

BACKGROUND

Corn leaf diseases can cause significant damage to crops, affecting food security as well as having severe economic impacts. Current corn disease detection techniques rely on spore traps or human detection with the naked eye, techniques which can be subjective and time consuming.

SUMMARY

Apparatuses for corn leaf disease detection are presented. In one embodiment, an apparatus includes an image sensor, an electronic display screen, a processor, and/or a memory. A memory, in certain embodiments, stores computer program code executable by a processor to perform operations. In some embodiments, an operation includes receiving an image of a corn leaf taken by an image sensor. An operation, in a further embodiment, includes processing an image of a corn leaf using multiple machine learning models, where each of the multiple machine learning models determines one or more likelihoods that the corn leaf has a plurality of diseases. An operation, in another embodiment, includes determining whether a corn leaf has any of a plurality of diseases based on one or more likelihoods. In some embodiments, an operation includes displaying, in response to determining that a corn leaf has one or more of a plurality of diseases, the one or more of the plurality of diseases to a user on an electronic display screen.

Computer program products for corn leaf disease detection are presented. A computer program product, in some embodiments, includes a non-transitory computer readable storage medium storing computer program code executable to perform operations. In some embodiments, an operation includes receiving an image of a corn leaf taken by an image sensor. An operation, in a further embodiment, includes processing an image of a corn leaf using multiple machine learning models, where each of the multiple machine learning models determines one or more likelihoods that the corn leaf has a plurality of diseases. An operation, in another embodiment, includes determining whether a corn leaf has any of a plurality of diseases based on one or more likelihoods. In some embodiments, an operation includes displaying, in response to determining that a corn leaf has one or more of a plurality of diseases, the one or more of the plurality of diseases to a user on an electronic display screen.

Methods for corn leaf disease detection are presented. In one embodiment, a method includes receiving an image of a corn leaf taken by an image sensor. A method, in a further embodiment, includes processing an image of a corn leaf using multiple machine learning models, where each of the multiple machine learning models determines one or more likelihoods that the corn leaf has a plurality of diseases. A method, in another embodiment, includes determining whether a corn leaf has any of a plurality of diseases based on one or more likelihoods. In some embodiments, a method includes displaying, in response to determining that a corn leaf has one or more of a plurality of diseases, the one or more of the plurality of diseases to a user on an electronic display screen.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Aspects of the present invention are described herein with reference to system diagrams, flowchart illustrations, and/or block diagrams of methods, apparatuses, systems, and computer program products according to embodiments of the invention. It will be understood that blocks of the flowchart illustrations and/or block diagrams, and combinations of blocks in the flowchart illustrations and/or block diagrams, can be implemented by computer readable program instructions.

Figure 1:
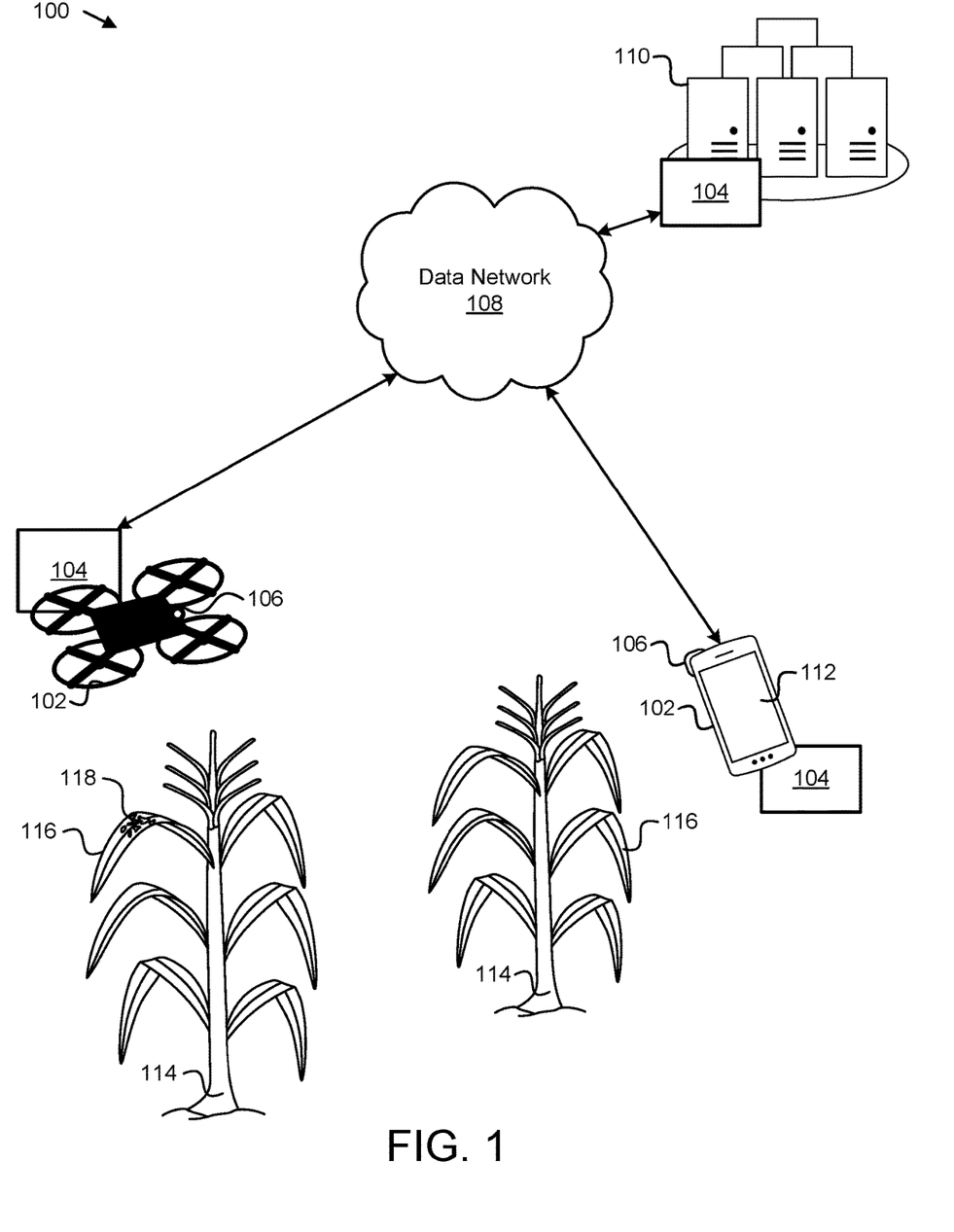
FIG. 1 is a perspective view illustrating one embodiment of a system for corn leaf disease detection.

FIG. 1 depicts one embodiment of a system 100 for corn leaf disease detection. The system 100, in the depicted embodiment, includes one or more hardware computing devices 102, one or more disease detection modules 104, an image sensor 106, a data network 108, one or more server computing devices 110, one or more electronic display screens 112, one or more plants 114 (e.g., corn plants 114 or the like) comprising one or more leaves 116 which may have one or more diseases 118.

In general, a disease detection module 104 is configured to determine a likelihood that a plant 114 has a disease 118 based at least partially on an image and/or other data from a camera 106 and/or another image sensor 106. In this manner, in certain embodiments, a system 100 may report and/or manage one or more diseases 118 using artificial intelligence and/or other machine learning, thereby enabling automated and/or early detection of disease 118, reducing an amount of pesticides used (e.g., due to the early detection), or the like. For example, in certain embodiments, a disease detection module 104 may process an image of a corn leaf 116 (e.g., a maize leaf of the genus *Zea*, or the like) and may determine whether the corn leaf 116 has southern corn leaf blight, gray leaf spot, common corn rust, and/or one or more other diseases 118.

A disease detection module 104, in some embodiments, may use artificial intelligence and/or other machine learning to process an image of a leaf 116 (e.g., a corn leaf 116, or the like). A disease detection module 104 may process an image of a leaf 116 using multiple machine learning models, to determine one or more likelihoods that the leaf 116 has one or more of a plurality of diseases 118. A disease detection module 104 may determine whether a leaf 116 has any of a plurality of diseases 118 and/or which disease 118 based on a combination of multiple likelihoods from multiple machine learning models, or the like.

A disease detection module 104 may be configured to perform a predefined action based on a disease determination, such as providing a user interface and/or other notification to a user (e.g., a graphical user interface (GUI), an application programming interface (API), a push notification, a text message, an email, or the like), applying a treatment to a plant 114 and/or leaf 116, quarantining a plant 114 and/or leaf 116, destroying a plant 114 and/or leaf 116, or the like based on a disease determination. For example, in some embodiments, a disease detection module 104 may comprise and/or be in communication with computer program code installed and/or executing on a hardware computing device 102, or the like such as a mobile application, a desktop application, a server application, or other computer program code executable by a processor and may display a user interface and/or perform a different action on an electronic display screen 112 of and/or using other hardware of the hardware computing device 102; may be disposed on and/or in communication with an unmanned aircraft (e.g., a drone), a robot, and/or other manned or unmanned vehicle comprising a store of treatment, an herbicide or other pesticide, and/or a dispenser to apply a treatment and/or herbicide; or the like. A disease detection module 104 may be configured to perform different actions for different types of diseases 118.

A disease detection module 104, in some embodiments, may support multiple sources and/or input methods for images from an image sensor 106. In one embodiment, a disease detection module 104 may receive data from a hardware computing device 102 over a wireless and/or wired data network 108, such as a wireless Bluetooth® connection, a wireless Wi-Fi connection, a wired ethernet connection, a wired universal serial bus (USB) connection, or the like. In certain embodiments, a disease detection module 104 may receive an uploaded image from an image sensor 106 (e.g., which a user may upload from a hardware computing device 102 and/or another source uploaded to a server computing device 110 over a data network 108, or the like) through a user interface (e.g., a GUI such as an application executing on a hardware computing device 102 and/or a web interface over a data network 108, an API, a command line interface (CLI), or the like).

A disease detection module 104, in one embodiment, determines a likelihood of a disease 118 based at least partially on data from a camera or other image sensor 106 and/or a hardware computing device 102. A likelihood that a leaf 116 has a disease 118, as used herein, comprises an estimated and/or predicted indication of whether the leaf 116 has the disease 118 (e.g., a confidence metric, a percentage likelihood, low/medium/high, green/yellow/red, an actual and/or estimated likelihood, or the like).

A disease detection module 104 may process and/or analyze image data from an image sensor 106 and/or a hardware computing device 102 to determine a likelihood of one or more diseases 118. In some embodiments, a disease detection module 104 may provide data from one or more image sensors 106 and/or hardware computing devices 102 as inputs into one or more machine learning models and/or other artificial intelligence and may receive one or more likelihoods of disease 118 as an output.

A disease detection module 104, in one embodiment, may be configured to perform a predefined action based on a likelihood of a disease 118 (e.g., in response to the likelihood of a disease 118 satisfying a threshold, based on a level of the likelihood of a disease 118, or the like). A disease detection module 104, in some embodiments, may perform an action comprising notifying a user (e.g., using an electronic display screen 112 of a hardware computing device 102, using an electronic speaker of a hardware computing device 102, or the like). For example, a disease detection module 104 may perform an action notifying a user of which diseases 118 a plant 114 and/or leaf 116 is likely to have, of whether a plant 114 and/or leaf 116 is healthy, or the like.

For example, in a GUI on an electronic display screen 112 of a hardware computing device 102, a disease detection module 104 may display a most recent likelihood of a disease 118, a health status, or the like; may display a graph, one or more trends, and/or another history of previous likelihoods of a disease 118, or the like (e.g., in an interactive GUI which a user may select starting and/or ending dates, zoom into different time periods, select different data elements, or the like); may display one or more recommendations and/or other notifications; and/or other user interface elements based on a likelihood of a disease 118 and/or a health status of one or more plants 114 and/or leaves 116. A disease detection module 104, in other embodiments, may display one or more metrics for a hardware computing device 102, such as a battery level, a device identifier, one or more settings, or the like.

In some embodiments, a disease detection module 104 may be configured to track one or more diseases 118 in an environment (e.g., in and/or around an image sensor 106, a field, a farm, a city, a town, a county, another geographic location, or the like). For example, a disease detection module 104 may track disease locations and/or spread and may determine a likelihood of a disease 118 based on both data from an image sensor 106 and location data of previously identified instances of a disease 118, or the like. In certain embodiments, a disease detection module 104 may communicate with one or more location sensors in order to track locations and/or spread of a disease 118, such as a global positioning system (GPS) sensor of a hardware computing device 102, an image sensor 106 such as a camera that has detected a presence of a disease 118, one or more cell towers and/or wireless routers (e.g., to determine a location of a hardware computing device 102 and/or image sensor 106 using triangulation), or the like. A disease detection module 104 may determine a recommendation for a user based on a location of one or more tracked diseases 118.

A hardware computing device 102, in some embodiments, comprises a mobile computing device 102 (e.g., a cellular telephone or other mobile telephone, a tablet device, a laptop computer, a portable disease detection device, a handheld video gaming device, or the like) that may comprise an image sensor 106, an electronic display screen 112, a processor, a memory (e.g., volatile and/or non-volatile). A disease detection module 104 may comprise a mobile application and/or other executable computer program code executing on the mobile computing device 102. In a further embodiment, a hardware computing device 102 comprises an unmanned aircraft 102 (e.g., a drone, or the like) that comprises an image sensor 106 and that flies in proximity to a leaf 116 to take one or more images of potential disease 118, or the like. In some embodiments, a disease detection module 104 may execute on and/or be in communication with a backend server computing device 110.

In some embodiments, a disease detection module 104 may comprise logic hardware such as one or more of a processor (e.g., a CPU, a controller, a microcontroller, firmware, microcode, an application specific integrated circuit (ASIC), a field programmable gate array (FPGA) or other programmable logic, or the like), a volatile memory, a non-volatile computer readable storage medium, a network interface, a printed circuit board, or the like. A disease detection module 104, in further embodiments, may include computer program code stored on a non-transitory computer readable storage medium (e.g., of a hardware computing device 102 and/or of a hardware computing device 102), executable by a processor to perform one or more of the operations described herein, or the like.

A disease detection module 104, in certain embodiments, may receive user input from a hardware computing device 102 (e.g., from a button, switch, touchscreen, and/or other user interface element), from a remote control device (e.g., an infrared remote control, a radio frequency remote control, a Bluetooth® remote control, or the like), from a user interface of a hardware computing device 102 over a data network 108 (e.g., a mobile computing device such as a smartphone, a smart watch, a tablet, a laptop, or the like; a desktop computer; a gaming device; a set-top box; a point-of-sale device, and/or another hardware computing device 102 comprising a processor and a memory).

The data network 108, in one embodiment, includes a digital communication network that transmits digital communications. The data network 108 may include a wireless network, such as a wireless cellular network, a local wireless network, such as a Wi-Fi network, a Bluetooth® network, a near-field communication (NFC) network, an ad hoc network, or the like. The data network 108 may include a wide area network (WAN), a local area network (LAN), an optical fiber network, the internet, or other digital communication network. The data network 108 may include a combination of two or more networks. The data network 108 may include one or more servers, routers, switches, and/or other networking equipment.

One or more disease detection modules 104, hardware computing devices 102, electronic display screens 112, and/or hardware computing devices 102 may be in communication over a data network 108, either directly or through a backend server computing device 110, or the like. A disease detection module 104 executing on a hardware computing device 102 (e.g., computer executable program code, an installable application, a mobile application, or the like), in some embodiments, may provide a user interface to notify a user and/or for a user to perform one or more actions and/or selections described herein.

Figure 2:
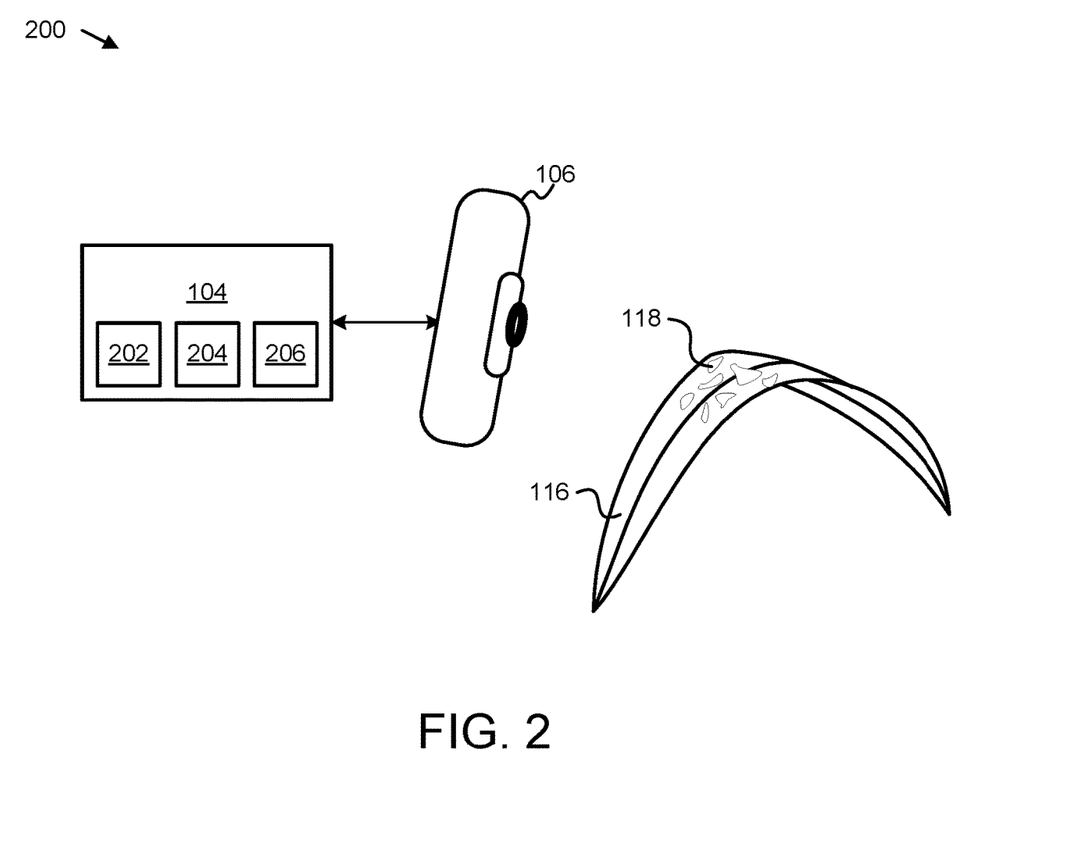
FIG. 2 is a schematic block diagram illustrating a further embodiment of a system for corn leaf disease detection.

FIG. 2 depicts one embodiment of a system 200 for corn leaf disease detection. The system 200 of FIG. 2, in some embodiments, may be substantially similar to the system 100 described above with regard to FIG. 1. In the depicted embodiment, the disease detection module 104 includes one or more machine learning models 202, 204, 206 such as a mobile convolutional neural network 202, a residual convolutional neural network 204, a deep convolutional neural network 206, or the like.

An image sensor 106, in one embodiment, may comprise a camera 106 integrated with and/or in communication with a hardware computing device 102 (e.g., a smartphone 102 camera 106, a webcam 106, a drone 102 camera 106, or the like). In a further embodiment, an image sensor 106 may comprise a dedicated camera device 106 installed in view of a leaf 116, or the like (e.g., a security camera 106, a network camera 106, a USB camera 106, a trail camera 106, a field camera 106, or the like). In some embodiments, a disease detection module 104 may be configured to receive image data (e.g., one or more photos and/or videos) directly from an image sensor 106. In other embodiments, a disease detection module 104 may provide a GUI allowing a user to upload image data (e.g., one or more photos and/or videos) from an image sensor 106 to the disease detection module 104 over a data network 108, or the like.

An image sensor 106 may capture image data (e.g., one or more photos and/or videos, or the like) of a leaf 116, stem, trunk, branch, fruit, blossom, and/or other portion of a plant 114, such as a corn leaf 116 of a corn plant 114, or the like. A disease detection module 104, in some embodiments, may process the image data (e.g., one or more photos and/or videos) to recognize one or more diseases 118 present on the leaf 116. For example, a disease detection module 104 may use one or more machine learning models 202, 204, 206 and/or other artificial intelligence image recognition to recognize a disease 118 (e.g., determine a likelihood that the leaf 116 and/or plant 114 has a disease, or the like).

A disease detection module 104, in certain embodiments, uses deep learning and/or other artificial intelligence to detect one or more diseases 118, for early diagnosis, or the like (e.g., in an automated manner, before the disease 118 is visible and/or detectable to the human eye, or the like). In a further embodiment, a disease detection module 104 may use a transfer learning technique for image classification with a convolutional neural network (CNN) based model 202, 204, 206, or the like. A CNN-based machine learning model 202, 204, 206 may comprise a series of layers, each of which includes a set of filters that are applied to an input image. Filters may be used to detect specific patterns and/or features in an image, and the output of each layer may be passed on to the next layer for further processing until a likelihood of a leaf 116 having a disease 118 is output.

In one embodiment, a disease detection module 104 may use multiple machine learning models 202, 204, 206 (e.g., two models, three models, four models, more than four models, or the like) in combination, such as a machine learning ensemble comprising multiple machine learning models 202, 204, 206 (e.g., to optimize disease detection and/or performance). For example, in some embodiments, at least one of the multiple machine learning models 202, 204, 206 comprise a convolutional neural network. In a further embodiment, the multiple machine learning models 202, 204, 206 comprise multiple convolutional neural networks.

For example, in one embodiment, a disease detection module 104 may use a mobile convolutional neural network 202 (e.g., with memory, storage, and/or processing requirements configured to execute on an embedded system 102, for on-device image classification, mobile vision, or the like) that uses depth wise separable convolutions applying a single filter to each input channel and performing a one-by-one pointwise convolution to combine the results across all of the input channels to determine a likelihood of disease 118. A mobile convolutional neural network 202 may use an expansion layer to decompress input data for a depth-wise convolution layer (e.g., used to reduce a number of parameters) that filters the data for a projection layer that compresses the data for output, or the like. In a further embodiment, a mobile convolutional neural network 202 may include a squeeze layer, an excitation layer, or the like (e.g., in a residual layer). A mobile convolutional neural network 202 may use h-swish non-linearity, may give unequal weights to different input channels when creating output feature maps, or the like. A mobile convolutional neural network 202 may be based on an inverted residual structure where the input and output of the residual block are thin bottleneck layers opposite residual models which use expanded representations at the input. A mobile convolutional neural network 202 may use lightweight depth wise convolutions to filter features in an intermediate expansion layer.

A disease detection module 104, in some embodiments, uses a residual convolutional neural network 204 with multiple stacked nonlinear layers and an identity mapping to determine a likelihood of disease 118. For example, a residual convolutional neural network 204 may include a plurality of residual blocks with skip connections configured to connect activations of a layer to another layer by skipping one or more layers in between to form a residual block. In this manner, instead of layers learning an underlying mapping, the network is fit to the residual mapping (e.g., using skip connections, residual blocks, or the like).

A disease detection module 104, in one embodiment, uses a deep convolutional neural network 206 with a plurality of fully connected layers and a plurality of convolutional layers (e.g., 16 layers, convolutional filters, hidden layers, pooling layers, fully connected layers, or the like) each with a three-by-three receptive field with a one pixel stride to determine a likelihood of disease 118. For example, by using a plurality of smaller three-by-three receptive fields, they combined provide the function of a larger receptive field but more non-linear activation layers accompany the convolution layers, improving decision functions and allowing the deep convolutional neural network 206 to converge more quickly, or the like. Using a smaller convolutional filter (e.g., a three-by-three filter, or the like) may reduce a tendency to over-fit during training, but may still capture left-right and up-down information to allow for an image's spatial features.

To train the machine learning models 202, 204, 206, a disease detection module 104 may use a large dataset of input-output pairs (e.g., labeled images of leaves 116 and/or diseases 118) and may use an optimization algorithm to adjust weights and/or biases of the network (e.g., the machine learning model 202, 204, 206 being trained) such that it can accurately predict the labels (e.g., likelihoods of diseases 118) of new images.

A disease detection module 104 may use a machine learning model 202, 204, 206 trained initially using a transfer learning technique for image classification (e.g., a model that has been trained on one task may be re-purposed and/or fine-tuned for use identifying one or more diseases 118). For image classification, a disease detection module 104 may use transfer learning with a pre-trained image classification model (e.g., pre-trained on images of objects other than corn leaves 116, or the like) as a starting point for training a new model on a disease 118 dataset (e.g., images of corn leaves 116 having a plurality of diseases 118). The pre-trained model may be a large and/or complex model that has been trained on a very large dataset, which contains millions of images with thousands of different classes, or the like. To transfer the knowledge from the pre-trained model to the new model, a disease detection module 104 may freeze the weights of the pre-trained model and train the new model using a new dataset of leaves 116 and/or diseases 118. Transfer learning may allow a new model to take advantage of the feature extraction capabilities of a pre-trained model, while still being able to learn task-specific features from a new dataset, or the like.

The machine learning models 202, 204, 206, in some embodiments, may include one or more added layers, such as a pooling average layer, one or more dens layers (e.g., with 100 units, with a rectified linear unit activation function, with a softmax activation function, or the like). A disease detection module 104 may determine whether a leaf 116 has a disease 118 based on one or more likelihoods from multiple machine learning models 202, 204, 206. For example, the disease detection module 104 may arrange multiple machine learning models 202, 204, 206 into a voting ensemble (e.g., determining that a leaf 116 has a disease 118 if likelihoods from a majority vote of the models 202, 204, 206 indicate by at least a threshold likelihood that the leaf 116 has the disease 118), may determine that a leaf 116 has a disease 118 if likelihoods from at least one of the models 202, 204, 206 indicate that the leaf 116 has a disease 118 by at least a threshold likelihood (e.g., a less conservative approach), may determine that a leaf 116 has a disease 118 if likelihoods from each one of the models 202, 204, 206 indicate that the leaf 116 has a disease 118 by at least a threshold likelihood (e.g., a more conservative approach), and/or may otherwise combine likelihoods from multiple machine learning models 202, 204, 206 to determine whether a leaf 116 and/or an associated plant 114 has a disease 118.

A disease detection module 104, in some embodiments, may perform one or more processing steps on an image from an image sensor 106 (e.g., to format the image for multiple machine learning models 202, 204, 206, or the like). For example, a disease detection module 104 may crop and/or resize an image of a leaf 116 to a predefined size for at least one of the multiple machine learning models 202, 204, 206 (e.g., standardizing an image, or the like).

A disease detection module 104, in one embodiment, is configured to display, in response to determining that a leaf 116 has one or more of a plurality of diseases 118, the one or more diseases 118 to a user on an electronic display screen 112 (e.g., of a hardware computing device 102, or the like). In a further embodiment, a disease detection module 104 is configured to display, in response to determining that a leaf 116 has none of a plurality of diseases 118, an indication that the leaf 116 is healthy to a user on an electronic display screen 112.

In some embodiments, a disease detection module 104 may comprise computer program code stored in a memory and executable by a processor to perform one or more of the operations described herein with regard to a disease detection module 104. For example, a processor may comprise a CPU, a microcontroller, firmware, microcode, an ASIC, an FPGA or other programmable logic, or the like (e.g., of a hardware computing device 102, of a server 110, of an unmanned aircraft 102, or the like), and a memory may comprise a volatile memory, a non-transitory computer readable storage medium, or the like in communication with a processor.

Figure 3:
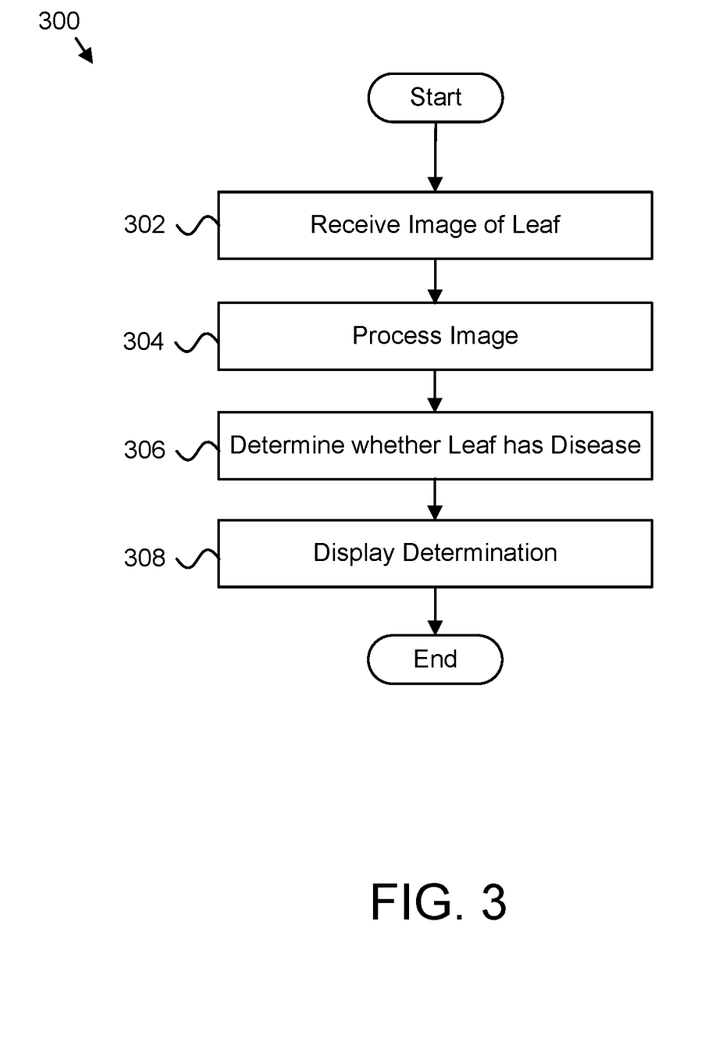
FIG. 3 is a schematic flow chart diagram illustrating one embodiment of a method for corn leaf disease detection.

FIG. 3 depicts one embodiment of a method 300 for corn leaf disease detection. The method 300 begins and a disease detection module 104 receives 302 an image of a corn leaf 114 taken by an image sensor 106. A disease detection module 104 processes 304 the received 302 image of the corn leaf 114 using multiple machine learning models 202, 204, 206, each of the multiple machine learning models 202, 204, 206 determining one or more likelihoods that the corn leaf 114 has a plurality of diseases 118. A disease detection module 104 determines 306 whether the corn leaf 114 has any of the plurality of diseases 118 based on the one or more likelihoods. A disease detection module 104 displays 308, in response to determining 306 that the corn leaf 114 has one or more of the plurality of diseases 118, the one or more of the plurality of diseases 118 to a user on an electronic display screen 112 and the method 300 ends.

Figure 4:
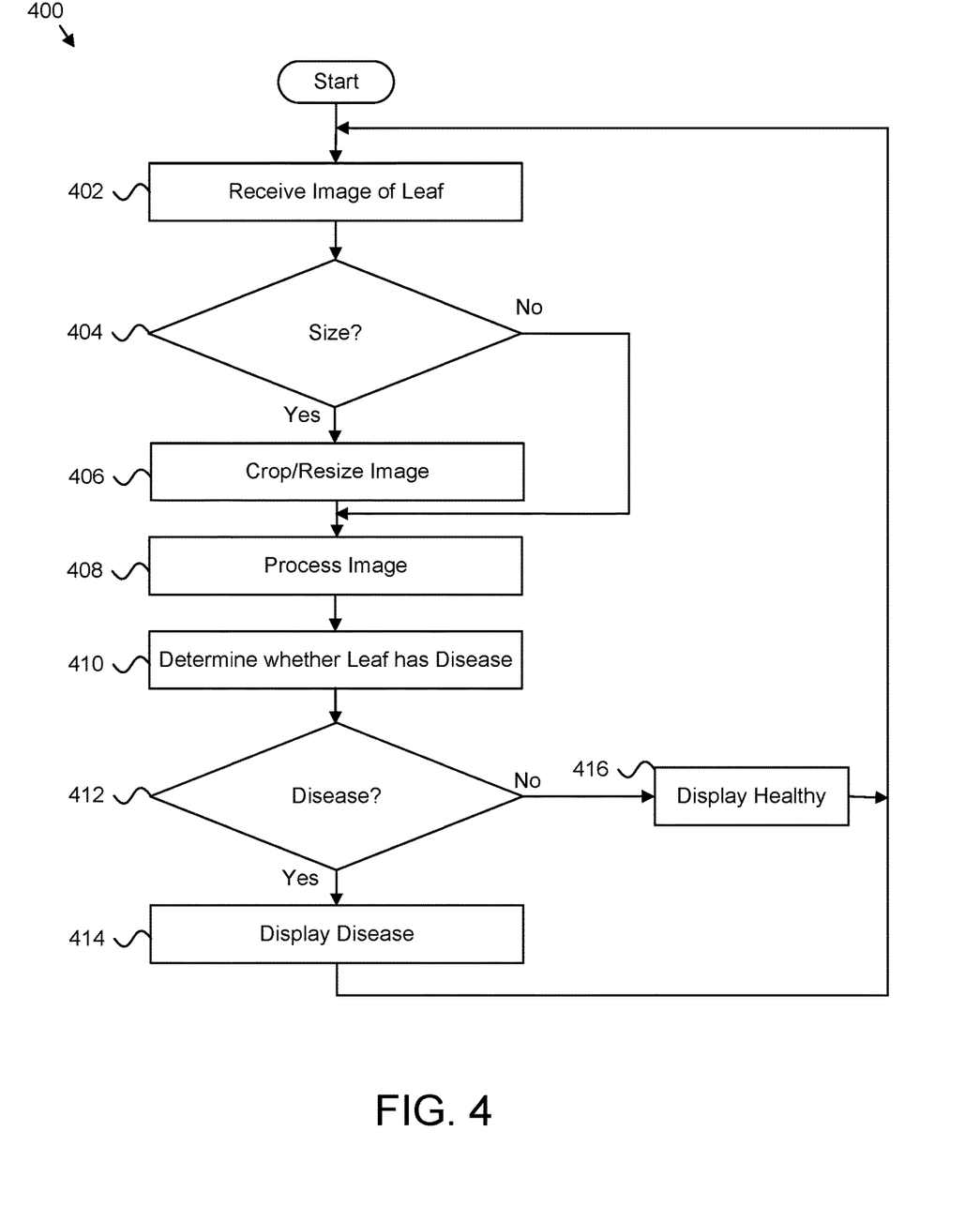
FIG. 4 is a schematic flow chart diagram illustrating a further embodiment of a method for corn leaf disease detection.

FIG. 4 depicts one embodiment of a method 400 for corn leaf disease detection. The method 400 begins and a disease detection module 104 receives 402 an image of a corn leaf 114 taken by an image sensor 106. A disease detection module 104 determines 404 whether or not to adjust a size of the received 402 image. If the disease detection module 104 determines 404 to adjust a size of the image, the disease detection module 104 crops and/or resizes the image of the corn leaf 114 to a predefined size for at least one of multiple machine learning models 202, 204, 206. A disease detection module 104 processes 408 the received 402 image of the corn leaf 114 using multiple machine learning models 202, 204, 206 to determine one or more likelihoods that the corn leaf 114 has a plurality of diseases 118. A disease detection module 104 determines 410 whether the corn leaf 114 has any of the plurality of diseases 118 based on the one or more likelihoods. A disease detection module 104 determines 412 whether to display 414, in response to determining that the corn leaf 114 has one or more of the plurality of diseases 118, the diseases to a user on an electronic display screen 112, or determines 412 to display 416, in response to determining that the corn leaf 114 has none of the plurality of diseases 118, an indication that the corn leaf is healthy to a user on the electronic display screen 112. A disease detection module 104 continues to monitor subsequent corn leaves 114 for diseases 118 as the method 400 continues.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments. These features and advantages of the embodiments will become more fully apparent from the following description and appended claims or may be learned by the practice of embodiments as set forth hereinafter.

As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules to emphasize their implementation independence more particularly. For example, a module may be implemented as a hardware circuit comprising custom very large scale integrated ("VLSI") circuits or gate arrays, off-the-shelf semiconductor circuits such as logic chips, transistors, or other discrete components. A module may also be implemented in programmable hardware devices such as an FPGA, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a server, cloud storage (which may include one or more services in the same or separate locations), a hard disk, a solid state drive ("SSD"), an SD card, a random access memory ("RAM"), a read-only memory ("ROM"), an erasable programmable read-only memory ("EPROM" or Flash memory), a static random access memory ("SRAM"), a Blu-ray disk, a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, a personal area network, a wireless mesh network, and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture ("ISA") instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages.

The computer readable program instructions may execute entirely on the user's computer, partly on the user's computer, as a stand-alone software package, partly on the user's computer and partly on a remote computer or service or entirely on the remote computer or server or set of servers. In the latter scenario, the remote computer may be connected to the user's computer through any type of network, including the network types previously listed. Alternatively, the connection may be made to an external computer (for example, through the Internet using an Internet Service Provider). In some embodiments, electronic circuitry including, for example, programmable logic circuitry, FPGA, or programmable logic arrays ("PLA") may execute the computer readable program instructions by utilizing state information of the computer readable program instructions to personalize the electronic circuitry to perform aspects of the present invention.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and computer program products according to various embodiments of the present invention. In this regard, each block in the schematic flowchart diagrams and/or schematic block diagrams may represent a module, segment, or portion of code, which comprises one or more executable instructions of the program code for implementing the specified logical functions.

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Means for performing the steps described herein, in various embodiments, may include one or more of a network interface, a controller (e.g., a CPU, a processor core, an FPGA or other programmable logic, an ASIC, a microcontroller, and/or another semiconductor integrated circuit device), a hardware appliance or other hardware device, other logic hardware, and/or other executable code stored on a computer readable storage medium. Other embodiments may include similar or equivalent means for performing the steps described herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
   an image sensor;
   an electronic display screen;
   a processor; and
   a memory storing computer program code executable by the processor to perform operations, the operations comprising:
   receiving an image of a corn leaf taken by the image sensor;
   processing the image of the corn leaf using multiple machine learning models, each of the multiple machine learning models determining one or more likelihoods that the corn leaf has a plurality of diseases, the multiple machine learning models comprising at least one convolutional neural network selected from the group comprising of:
      a mobile convolutional neural network using depth wise separable convolutions applying a single filter to each input channel and performing a one-by-one pointwise convolution to combine the results across all of the input channels;
      a residual convolutional neural network with multiple stacked nonlinear layers and an identity mapping; and
      a deep convolutional neural network comprising a plurality of fully connected layers and a plurality of convolutional layers each with a three-by-three receptive field with a one pixel stride;
   determining whether the corn leaf has any of the plurality of diseases based on the one or more likelihoods; and
   displaying, in response to determining that the corn leaf has one or more of the plurality of diseases, the one or more of the plurality of diseases to a user on the electronic display screen.

2. The apparatus of claim 1, the operations further comprising, displaying, in response to determining that the corn leaf has none of the plurality of diseases, an indication that the corn leaf is healthy to a user on the electronic display screen.

3. The apparatus of claim 1, wherein the at least one convolutional neural network comprises transfer learning pre-trained on images of objects other than corn leaves and subsequently trained on images of corn leaves having the plurality of diseases.

4. The apparatus of claim 1, the operations further comprising one or more of cropping and resizing the image of the corn leaf to a predefined size for at least one of the multiple machine learning models.

5. The apparatus of claim 1, wherein determining whether the corn leaf has any of the plurality of diseases comprises determining that the corn leaf has one of the plurality of diseases in response to a majority vote of the one or more likelihoods from the multiple machine learning models indicating that the corn leaf has at least a threshold likelihood of having the one of the plurality of diseases.

6. The apparatus of claim 1, wherein determining whether the corn leaf has any of the plurality of diseases comprises determining that the corn leaf has one of the plurality of diseases in response to at least one of the one or more likelihoods from the multiple machine learning models indicating that the corn leaf has at least a threshold likelihood of having the one of the plurality of diseases.

7. The apparatus of claim 1, wherein determining whether the corn leaf has any of the plurality of diseases comprises determining that the corn leaf has one of the plurality of diseases in response to each of the one or more likelihoods from the multiple machine learning models indicating that the corn leaf has at least a threshold likelihood of having the one of the plurality of diseases.

8. The apparatus of claim 1, wherein the corn leaf comprises a maize leaf of the genus *Zea*.

9. The apparatus of claim 1, wherein the plurality of diseases comprise at least southern corn leaf blight, gray leaf spot, and common corn rust.

10. The apparatus of claim 1, wherein receiving the image comprises receiving, at a hardware server device over a data network, an upload of the image using a website interface.

11. The apparatus of claim 1, further comprising a mobile computing device, wherein the mobile computing device comprises the image sensor, the electronic display screen, the processor, and the memory, and the computer program code comprises a mobile application executing on the mobile computing device.

12. The apparatus of claim 1, further comprising an unmanned aircraft, wherein the unmanned aircraft comprises the image sensor and flies in proximity to the corn leaf to take the image.

13. A computer program product comprising a non-transitory computer readable storage medium storing computer program code executable to perform operations, the operations comprising:
   receiving an image of a corn leaf taken by an image sensor;
   processing the image of the corn leaf using multiple machine learning models, each of the multiple machine learning models determining one or more likelihoods that the corn leaf has a plurality of diseases, the multiple machine learning models comprising at least one convolutional neural network selected from the group comprising of:
      a mobile convolutional neural network using depth wise separable convolutions applying a single filter to each input channel and performing a one-by-one pointwise convolution to combine the results across all of the input channels;
      a residual convolutional neural network with multiple stacked nonlinear layers and an identity mapping; and
      a deep convolutional neural network comprising a plurality of fully connected layers and a plurality of convolutional layers each with a three-by-three receptive field with a one pixel stride;
   determining whether the corn leaf has any of the plurality of diseases based on the one or more likelihoods; and
   displaying, in response to determining that the corn leaf has one or more of the plurality of diseases, the one or more of the plurality of diseases to a user on an electronic display screen.

14. The computer program product of claim 13, the operations further comprising displaying, in response to determining that the corn leaf has none of the plurality of diseases, an indication that the corn leaf is healthy to a user on the electronic display screen.

15. The computer program product of claim 13, the operations further comprising one or more of cropping and resizing the image of the corn leaf to a predefined size for at least one of the multiple machine learning models.

16. A method comprising:
   receiving an image of a corn leaf taken by an image sensor;
   processing the image of the corn leaf using multiple machine learning models, each of the multiple machine learning models determining one or more likelihoods that the corn leaf has a plurality of diseases, the multiple machine learning models comprising at least one convolutional neural network selected from the group comprising of:
- a mobile convolutional neural network using depth wise separable convolutions applying a single filter to each input channel and performing a one-by-one pointwise convolution to combine the results across all of the input channels;
- a residual convolutional neural network with multiple stacked nonlinear layers and an identity mapping; and
- a deep convolutional neural network comprising a plurality of fully connected layers and a plurality of convolutional layers each with a three-by-three receptive field with a one pixel stride;

determining whether the corn leaf has any of the plurality of diseases based on the one or more likelihoods; and displaying, in response to determining that the corn leaf has one or more of the plurality of diseases, the one or more of the plurality of diseases to a user on an electronic display screen.

\* \* \* \* \*